June 2, 1925.  
D. H. TAYLOR  
PACKING  
Filed March 18, 1924
1,539,969
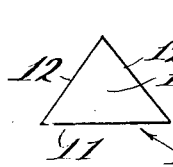
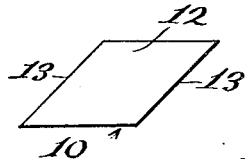
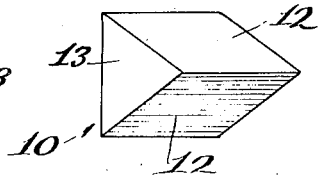
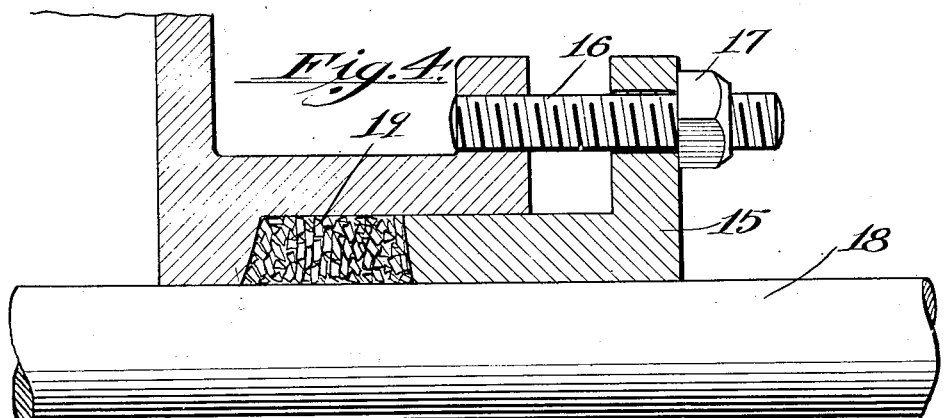
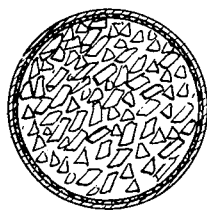
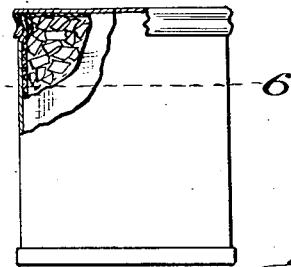
Inventor:
Daniel H. Taylor.
By Hazard and Miller
Attorneys Patented June 2, 1925.

1,539,969

UNITED STATES PATENT OFFICE.

DANIEL H. TAYLOR, OF LOS ANGELES, CALIFORNIA.

PACKING.

Application filed March 18, 1924. Serial No. 700,064.

*To all whom it may concern:*

Be it known that I, DANIEL H. TAYLOR, a citizen of the United States, residing at Los Angeles, in the county of Los Angeles and State of California, have invented new and useful Improvements in Packings, of which the following is a specification.

This invention relates to packing material, and it has particularly valuable application as a packing for stuffing boxes, wherein a joint tight against fluids is required for pistons, rods, shafts, etc.

This invention contemplates packing material comprising a plurality of units each of triangular shape in cross section and preferably having oblique ends. The ends of each unit may be either oblique to the base only or oblique to the base and to the sides, and the ends may be parallel or non-parallel to each other. The size of the units may be varied in accordance with the requirements of different conditions, but the size in general is, for example, from one-eighth of an inch to one inch in diameter.

The packing of my invention may consist of any suitable material or combination of materials, such, for example, as wood, fibre or metal.

I have found that by forming the units as above described, such units in a mass are readily slidable over each other, or in other words, are mobile; this feature gives to the mass a property approximating in degree the fluidity of a liquid, whereby the mass of packing material changes its shape to conform to the configuration of the space in which it is placed. Such packing material, when used in stuffing boxes, automatically makes at all times and under all conditions, a close contact, and thereby a tight joint, with a piston, shaft, or the like.

The mobility of my improved packing material avoids the "walling up" of the packing material of the prior art, in which pieces or units constituting the mass were juxtaposed by the reciprocating rod or shaft in a manner which created unduly large clefts or fissures, resulting in a leakage through the stuffing box. When such "walling up" action occurred, it was necessary to exert an excessive pressure upon the gland of the stuffing box in an attempt to force the packing to spread and eliminate the fissures, but such attempts have given unsatisfactory results. Furthermore, the undue pressure exerted on the gland resulted in the crushing of the pieces of the packing material and thereby impaired the efficiency of the same, and the necessity for unduly tightening the gland of the stuffing box in attempting to temporarily remedy the "walling up" condition was frequently responsible, when tightening the nuts on the bolts of the stuffing box gland, for stripping the threads of the bolts. The above mentioned troubles have been eliminated by my invention, which provides packing material, which, with minimum pressure of the gland, expands readily and uniformly in all directions.

In order to further increase the intermobility of the units comprising the packing material, I prefer to lubricate the same with any suitable lubricant. When the units are made of wood, they are preferably boiled in lubricating oil until thoroughly impregnated, after which they are coated with grease, wax, or the like. If the units are made of a non-absorbent material, such as metal, only the surfaces are coated with wax, graphite, grease, or the like. Subsequent to the lubrication of the units, quantities of the same are preferably placed in cotton tubes or bags and these in turn are placed in metal containers for shipment.

The lubrication of the units not only increases their intermobility, but has the further advantage of keeping them separate by preventing their agglomeration into a solid mass. Such agglomeration has occurred when using metallic packing of the prior art and has necessitated resort to a chiseling procedure to remove the packing from the stuffing box.

The peculiar formation which I have given to the units of packing material has the further advantage of causing a mass of the same to be very compact, or in other words, to have a small percentage of interstices, from which it follows that the packing material of my invention provides a tighter joint between the stuffing box and a shaft or rod than the packing materials previously employed.

The slant or obliquity which I have given to the ends of the units of the packing material not only assists in preventing "walling up" action and giving mobility to the units, but also reduces the chances of splitting the units when the same are made of wood.

In the drawings:

Figure 1 is an end view,

Fig. 2 is a side view, and

Fig. 3 is a perspective view, of a unit of my improved packing material;

Fig. 4 is a longitudinal section of a stuffing box showing a rod passing therethrough and packed with the material of this invention;

Fig. 5 is an elevational view, partly in section, showing a quantity of my packing material placed in cotton tubing and placed in a container; and Fig. 6 is a transverse section taken on the line 6—6 of Fig. 5.

Referring to the drawings for a more detailed description thereof, the numeral 10 indicates a unit of my packing material, the unit being triangular in cross section and having a base 11, sides 12 and ends 13. The ends 13 are oblique to the base 11 and to the sides 12 and are parallel with each other.

In Fig. 4, the numeral 14 indicates a stuffing box comprising a follower 15 and provided with threaded bolts 16 and nuts 17. A rod 18 passes through the stuffing box and is encircled by packing material 19 of my invention and comprising a plurality of units 1 lubricated as previously described.

While I have herein described one form of my invention, modifications thereof may be devised without departing from the spirit thereof, and it is to be understood that such modifications come within the scope of this invention.

What is claimed is:

1. Packing material comprising a plurality of units each of triangular shape in cross section and having parallel oblique ends.

2. Packing material comprising a plurality of lubricated units each of triangular shape in cross section and having parallel oblique ends.

In testimony whereof I have signed my name to this specification.

DANIEL H. TAYLOR.